(12) United States Patent
Raftis

(10) Patent No.: US 6,923,421 B2
(45) Date of Patent: Aug. 2, 2005

(54) FLEXIBLE HALF SLEEVE STYLE PINCH VALVE

(75) Inventor: Chris Raftis, Pittsburgh, PA (US)

(73) Assignee: Red Valve Co., Inc., Carnegie, PA (US)

( * ) Notice: Subject to any disclaimer, the term of this patent is extended or adjusted under 35 U.S.C. 154(b) by 0 days.

(21) Appl. No.: 10/668,836

(22) Filed: Sep. 23, 2003

(65) Prior Publication Data

US 2004/0056220 A1 Mar. 25, 2004

Related U.S. Application Data

(60) Provisional application No. 60/412,845, filed on Sep. 23, 2002.

(51) Int. Cl.[7] .................................................. F16K 7/04
(52) U.S. Cl. .............................................. 251/4; 251/5
(58) Field of Search ....................................... 251/4–10

(56) References Cited

U.S. PATENT DOCUMENTS

| | | | | |
|---|---|---|---|---|
| 2,828,101 A | * | 3/1958 | Antram | 251/5 |
| 2,972,464 A | * | 2/1961 | Jones et al. | 251/5 |
| 3,441,245 A | * | 4/1969 | Holland et al. | 251/5 |
| 3,826,461 A | * | 7/1974 | Summerfield et al. | 251/7 |
| 4,108,418 A | * | 8/1978 | Ensign et al. | 251/5 |
| 4,518,145 A | * | 5/1985 | Keltz et al. | 251/5 |
| 5,535,983 A |   | 7/1996 | Hohermuth | |
| 6,102,361 A | * | 8/2000 | Riikonen | 251/5 |

* cited by examiner

Primary Examiner—Justine R. Yu
Assistant Examiner—John K. Fristoe, Jr.
(74) Attorney, Agent, or Firm—The Webb Law Firm (57) ABSTRACT

A half-sleeve pinch valve includes a first body member and a second body member. The first body member and the second body member are connected to define a passage. A semi-circular sleeve is positioned within the passage such that a middle portion of the sleeve is adjacent either the first body member or the second body member, defining a fully open state. A port is located in either the first body member or the second body member adjacent the sleeve and is in fluid communication with the passage. A closing fluid is introduced through the port into the passage, thereby displacing the middle portion of the sleeve into the passage to move the sleeve from the fully open state through a partially open or partially closed state to a fully closed state. A method for controlling the flow in a passage is also disclosed.

9 Claims, 5 Drawing Sheets

FLEXIBLE HALF SLEEVE STYLE PINCH VALVE

This application claims the benefit of Provisional application Ser. No. 60/412,845, filed Sep. 23, 2002.

BACKGROUND OF THE INVENTION

1. Field of the Invention

This invention relates to pinch type flow control valves that restrict fluid flow either in a pipeline or at the end of a pipeline.

2. Description of Related Art

Conventional pinch valves consist of either a single tubular "sleeve" or a "combined sleeve" consisting of two "half-sleeves" mechanically joined on the horizontal centerline. When the valve is operated by applying air pressure between the outside of the sleeve and the inside of the valve body, the sleeve is squeezed toward the centerline of the valve. This squeezing action typically occurs from two opposite sides.

Closing the valve, either partially or fully, limits the flow of water through the attached piping. The valve can be adjusted to achieve the desired flow by adjusting the operating air pressure.

In a conventional pinch valve, the sleeve closes from two opposite sides at the same time. This produces a specific throttling action for a specific amount of operating air pressure. If only one side of the sleeve is closed, the sensitivity to operating air pressure is less, that is, it requires more sleeve motion (which requires more air pressure) to reduce the flow by the same amount.

It is an object of the present invention to provide improved control of fluid flow at reduced cost. By having the valve pinching action only from one side of the valve, the sleeve does not need to be fully circular. It can be a "half-sleeve" pinching only from one side against the opposite valve body wall. A half-sleeve is less costly to manufacture.

BRIEF SUMMARY OF THE INVENTION

A pinch type flow control valve of the present invention includes a first body member and a second body member. The first body member and the second body member are preferably semi-circular and connect to define a generally circular passage. A sleeve (preferably semi-circular in cross-section) is positioned within the passage such that edges of the sleeve are sealingly mated with the first body member and/or the second body member. In a fully open state, a middle portion of the sleeve is positioned adjacent either the first body member or the second body member. A port is located in either the first body member or the second body member adjacent the sleeve and is in fluid communication with the passage. When a closing fluid is introduced through the port into the passage, the middle portion of the sleeve is displaced into the passage. The sleeve can be displaced from the fully open state through a partially open or partially closed state to a fully closed state in which the middle portion of the sleeve is positioned adjacent the other of the first body member or the second body member.

Preferably, the first body member and the second body member each include opposed side flanges. The first body member and the second body member are connected together at the side flanges in any conventional manner, for example, by nuts and bolts. The sleeve also includes opposed side flanges which are sandwiched between the side flanges of the first body member and the second body member.

Preferably, the first body member and the second body member each further include opposed end flanges. The first body member and the second body member are connected to adjacent pipelines at the end flanges in any conventional manner, for example, by nuts and bolts. The sleeve also includes opposed end flanges which are sandwiched between the end flanges of the first body member or the second body member and the adjacent pipelines. A gasket is sandwiched between the end flanges of the other of the first body member or the second body member and the adjacent pipelines.

A method of controlling flow in a passage includes positioning a semi-circular sleeve within the passage. A middle portion of the sleeve is positioned adjacent a valve body. A process fluid is passed through the passage when the sleeve is in a fully open state. A closing fluid is introduced into a space between the middle portion of the sleeve and the valve body, thereby displacing the middle portion of the sleeve into the passage and restricting the flow of the process fluid through the passage.

BRIEF DESCRIPTION OF THE SEVERAL VIEWS OF THE DRAWINGS

FIG. 1b is a side view of the valve shown in FIG. 1a;

FIG. 1c is a top view of the valve shown in FIG. 1a;

FIG. 2b is a side view of the valve shown in FIG. 2a;

FIG. 3b is a side view of the valve shown in FIG. 3a;

FIG. 4b is a side view of the valve shown in FIG. 4a.

DETAILED DESCRIPTION OF THE INVENTION

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

For simplicity throughout the following descriptions, the term "air" will be used for the closing fluid medium, and the term "water" will be used for the process fluid (pipeline) medium. It is to be understood that there are many other fluids (gasses and liquids) suitable for closing the valve, for example, nitrogen gas, water, hydraulic oil, etc. The only restriction is that the fluid be compatible with the sleeve and body materials. Also, the process fluid can be any fluid compatible with the sleeve material lining and the inside of the valve body, for example, air, nitrogen gas, water based slurries, hydrocarbon gasses and liquids, etc.

Referring to FIGS. 1a–c, 2a–b, and 3a–b, a valve 10 includes a valve body 12, a semi-circular sleeve 14, and a port 16. The generally circular valve body 12 includes a first body member 18 and a second body member 20. The first body member 18 and the second body member 20 are each generally semi-circular in shape. The first body member 18 and the second body member 20 mate such that a passage 22 is thereby defined. The first body member 18 and the second body member 20 are joined in any conventional method. Preferably, each of the first body member 18 and the second body member 20 include opposed side flanges 24, 26 extending from either side of a semi-circular portion 28, 30. Nuts and bolts (not shown) connect the side flanges 24 of the first body member 18 to the side flanges 26 of the second body member 20. Preferably, each of the first body member 18 and the second body member 20 include opposed end flanges 32, 34 extending from either end of the semi-circular portion 28, 30. Nuts and bolts (not shown) connect the end flanges 32, 34 of the first body member 18 and the second body member 20 to an adjacent pipeline (not shown).

Figure 1A:
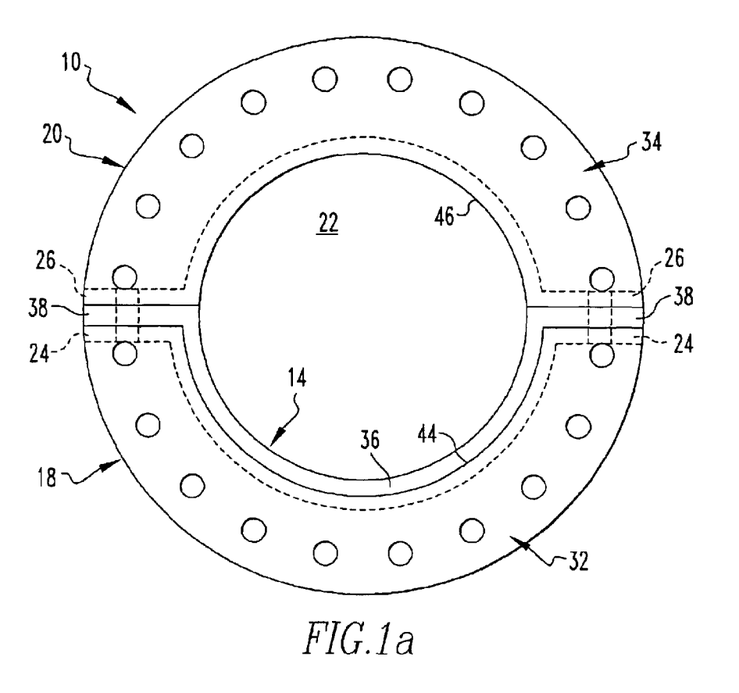
FIG. 1a is an end view of a valve according to the present invention with a sleeve fully open.
Figure 1B:
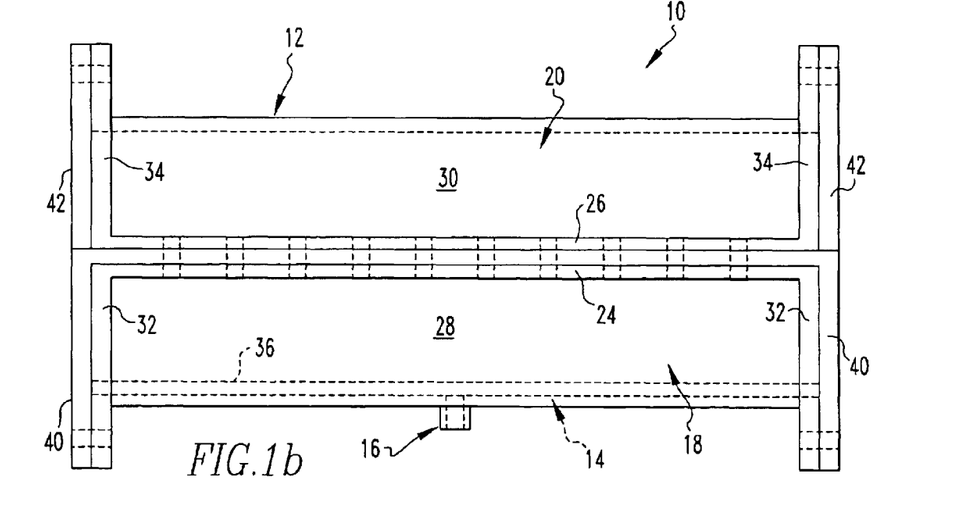
Figure 1C:
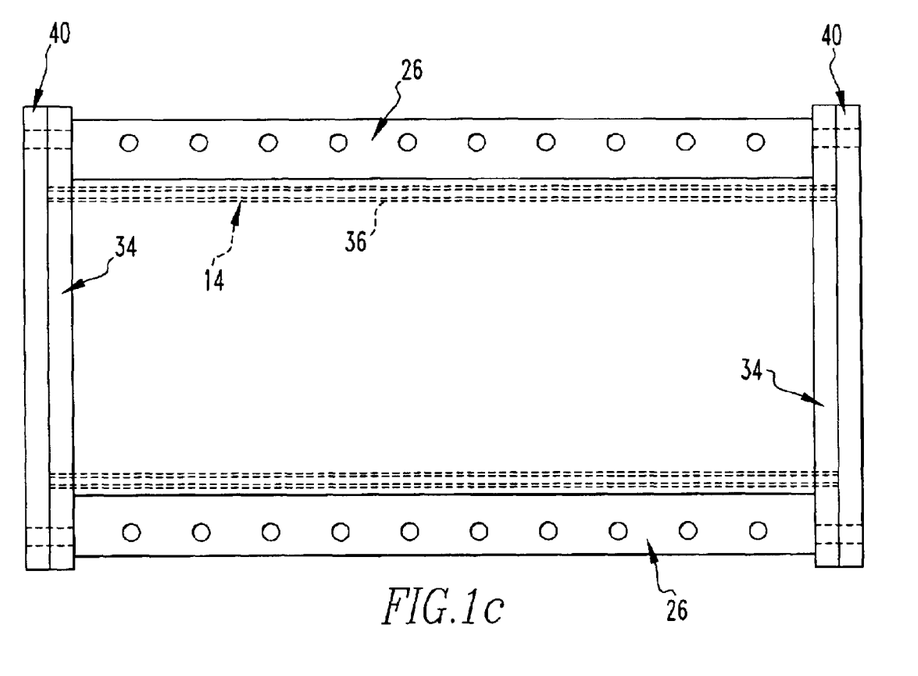

When the sleeve 14 is in a fully open position, a middle portion 36 of the sleeve 14 is positioned against and along one of either the first body member 18 or the second body member 20, for example, against and along the first body member 18 as shown in FIGS. 1a–c. The sleeve 14 is secured between the first body member 18 and the second body member 20 when the two are joined together. Preferably, the sleeve 14 has opposed side flanges 38 that are sandwiched between the opposed side flanges 24, 26 of the first body member 18 and the second body member 20. Thus, the middle portion 36 is not fixed in position and is free to move radially within the passage 22. The sleeve 14 also includes opposed end flanges 40 extending from either end of the middle portion 36. The end flanges 40 are sandwiched between the valve 10 and the adjacent pipelines when the valve 10 is connected to pipelines. The end flanges 40 of the sleeve 14 then act as a seal, as shown in FIG. 1b. Gaskets 42 may be positioned adjacent the end flanges 34 of the second body member 20, where no sleeve is present, to complete the seal between the valve 10 and the pipelines.

A body bore 44 (or inside diameter) of the first body member 18 has a diameter approximately equal to an outside diameter of the sleeve 14. A body bore 46 (or inside diameter) of the second body member 20 has a diameter approximately equal to an inside diameter of the sleeve 14. Thus, in the fully open position, the defined passage 22 is round, that is, there is a smooth transition from the sleeve 14 to the second body member 20.

Figure 2A:
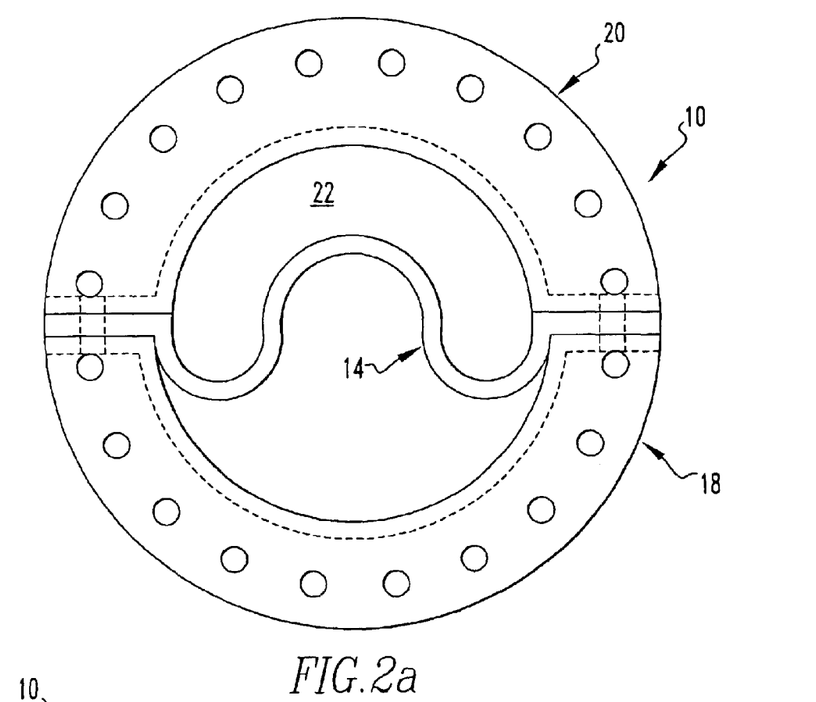
FIG. 2a is an end view of the valve shown in FIG. 1a with the sleeve partially closed.
Figure 2B:
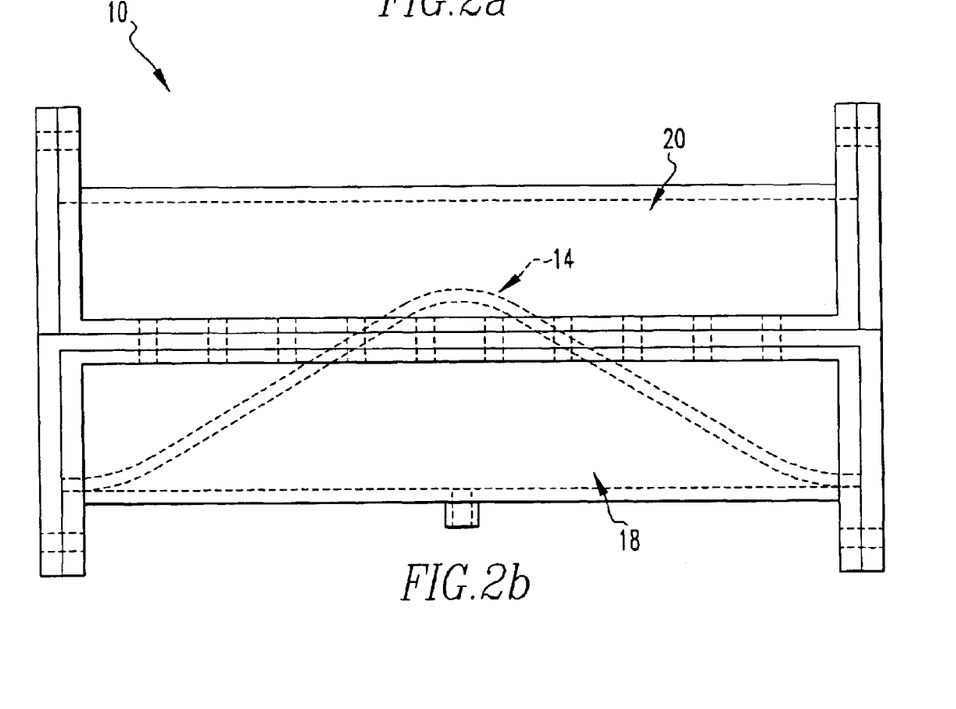
Figure 3A:
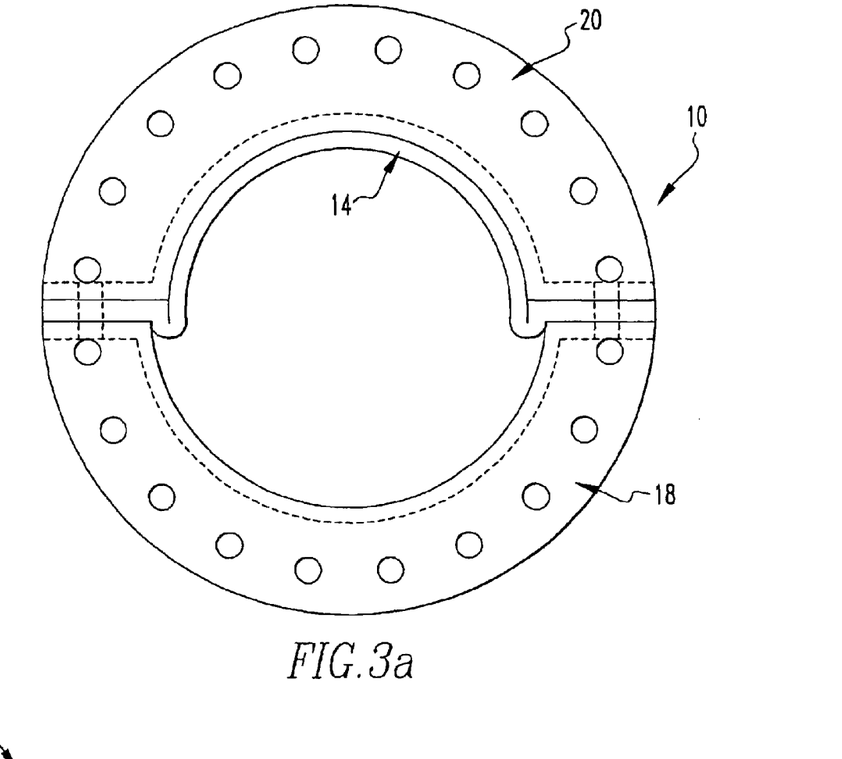
FIG. 3a is an end view of the valve shown in FIG. 1a with the sleeve fully closed.
Figure 3B:
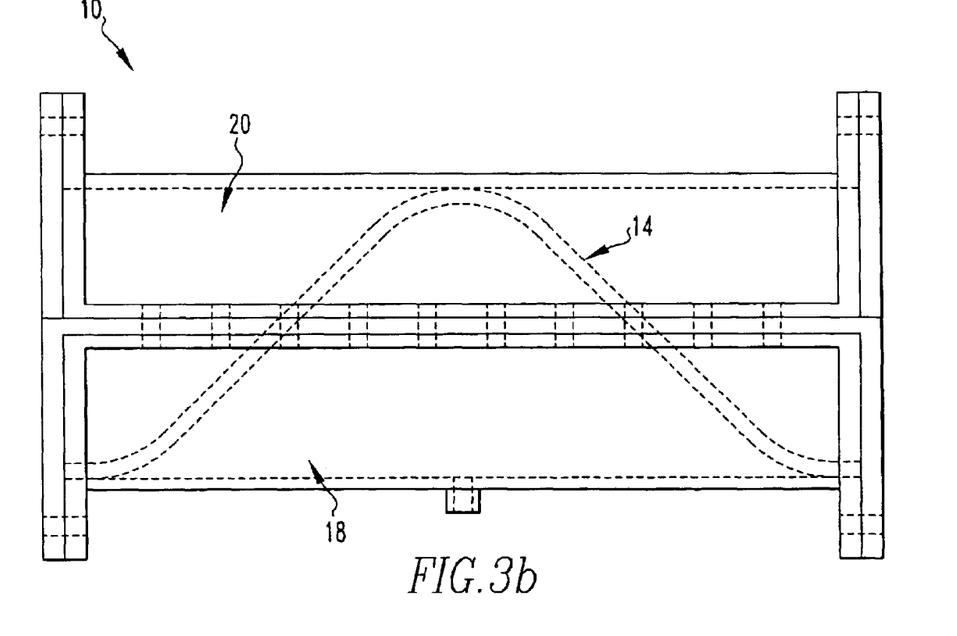

The port 16 is located in either the first body member 18 or second body member 20, whichever lies against the sleeve 14 in the fully open position (the first body member 18 in FIGS. 1b, 2b, and 3b). The port 16 is adapted to receive a fitting (not shown) and creates an inlet/outlet for an air supply (not shown). When air enters through the port 16, the air pushes the middle portion 36 of the sleeve 14 into the passage 22. Thus, the application of air into the port 16 causes the sleeve 14 to move from a fully open position through to a fully closed position.

FIG. 1a shows an end view of the valve 10 according to the present invention with the sleeve 14 fully open. FIG. 1b shows a side view with the sleeve 14 fully open. FIG. 1c shows a top view with the sleeve 14 fully open. FIG. 2a shows an end view with the sleeve 14 partially closed. FIG. 2b shows a side view with the sleeve 14 partially closed. FIG. 3a shows an end view with the sleeve 14 fully closed. FIG. 3b shows a side view with the sleeve 14 fully closed.

Thus, the air operated pinch valve 10 according to the present invention includes a single "half-sleeve" 14 and closes from one side of the valve 10 only. When the valve 10 is completely open, the half-sleeve 14, in combination with the valve body 12 (i.e., the second body member 20), defines the fully round passage 22 providing no restriction to fluid flow. As the half-sleeve 14 moves toward an opposite wall of the valve body 12, the fluid flow is reduced. In the fully closed position, the half-sleeve 14 seals against the opposite wall of the valve body 12.

Operating air pressure is applied to the port 16 in the valve body 12. When the operating air pressure exceeds a water pressure in the line, the sleeve 14 begins to be pushed inward, throttling the flow. Depending on the durometer of an elastomer used to make the sleeve 14 and the number and type of fabric plies used, approximately 20 to 50 psi above line pressure is required to close the sleeve 14 completely.

The sleeve 14 is typically made of an elastomer with a "Shore A" durometer in the range of 35 to 60 and may use nylon or polyester reinforcement. Other suitable materials may be used. The valve body 12 is typically fabricated from steel or cast from cast iron or ductile iron. Other suitable materials, including stainless steel, bronze, PVC plastic, etc. can also be used.

In some cases it is either desirable, or necessary, to allow some flow through a valve (or for flow to bypass around the valve) and prevent shutting off the flow completely. For example, if the valve is at the outlet of a positive displacement pump and the valve shuts off completely, the pressure generated by the positive displacement pump will continue to increase until either the pump stalls or something breaks to relieve the pressure. Although the valve can be prevented from closing completely by limiting the operating air pressure, it is always possible for the equipment controlling the operating air pressure to fail and apply more than enough pressure to close the valve completely. One method to prevent this is to install a by-pass line around the valve. However, piping a bypass line around the valve is expensive in both material and labor.

Figure 4A:
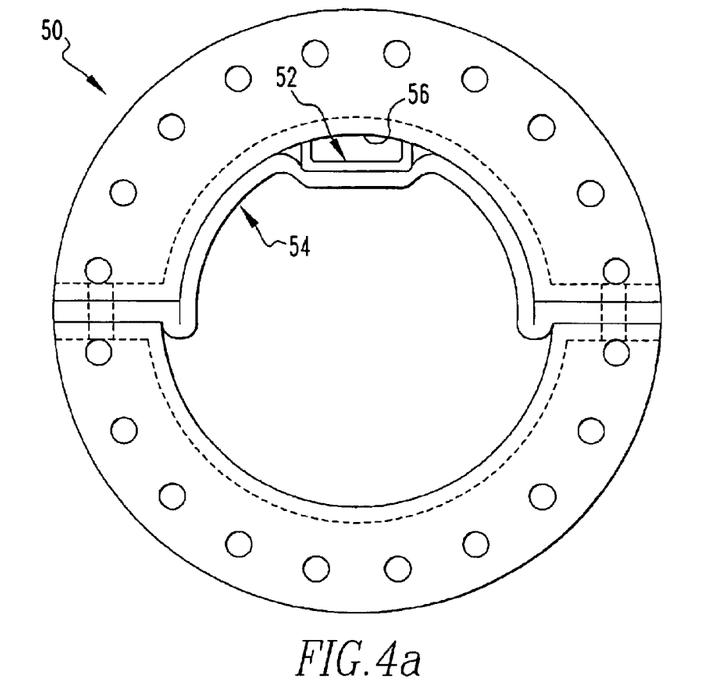
FIG. 4a is an end view of a valve according to the present invention with an auxiliary passage and with a sleeve fully closed.
Figure 4B:
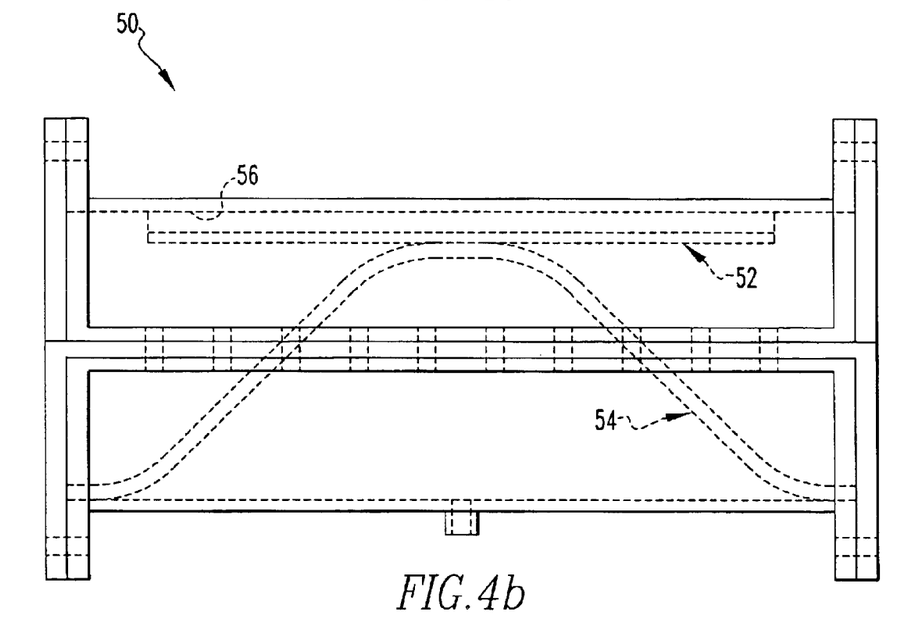

FIGS. 4a and 4b show an end view and side view of an embodiment of the present invention where a valve 50 includes a channel 52 to prevent a sleeve 54 from closing the valve 50 completely and, thus, allows a pre-determined amount of flow through the valve 50. FIGS. 4a and 4b show the valve 50 in the fully closed position (with a fluid path through the channel 52). The channel 52 may be of any cross-sectional area and shape and may be fastened to an inside wall 56 of the valve 50 by suitable means, such as welding.

It will be understood by those skilled in the art that while the foregoing description sets forth in detail preferred embodiments of the present invention, modifications, additions, and changes might be made thereto without departing from the spirit and scope of the invention.

The invention claimed is:

1. A valve, comprising:
   a valve body defining a passage;
   a semi-circular sleeve including opposed edges sealingly mated with an interior of the valve body and a displaceable middle portion; and
   a port located in the valve body adjacent the sleeve and adapted for fluid communication with a pressurized fluid source, wherein when fluid is introduced through the port, the middle portion of the sleeve is displaced into the passage to at least partially close the passage;

the valve body includes a first body sleeve-receiving member and a second body member connected to define the passage, and the middle portion of the sleeve, when in a fully open state, is adjacent the first sleeve-receiving body member; and further including a channel connected to and extending along the second body member within the passage, wherein when the middle portion of the sleeve is fully displaced, the channel prevents the passage from being completely closed off by the sleeve.

2. The valve according to claim 1, wherein the first sleeve-receiving body member and the second body member are semi-circular in cross-section.

3. The valve according to claim 1, wherein:

the first sleeve-receiving body member includes opposed side flanges, the second body member includes opposed side flanges, the sleeve includes opposed side flanges, and the first sleeve-receiving body member and the second body member are connected such that the sleeve side flanges are positioned between the first sleeve-receiving body member side flanges and the second body member side flanges.

4. The valve according to claim 1, wherein:

the first sleeve-receiving body member includes opposed end flanges, the second body member includes opposed end flanges, the sleeve includes opposed end flanges, the sleeve end flanges are positioned adjacent the end flanges of the first sleeve-receiving body member, and a gasket is positioned on an opposite side of the passage from each sleeve end flange.

5. The valve according to claim 1, wherein when the middle portion of the sleeve is adjacent the first sleeve-receiving body member:

an inside diameter of the first sleeve-receiving body member is substantially equal to an outside diameter of the middle portion of the sleeve, and an inside diameter of the second body member is substantially equal to an inside diameter of the middle portion of the sleeve.

6. The valve according to claim 1, wherein the sleeve is made of an elastomeric material.

7. A method of controlling flow in a passage, comprising the steps of:

positioning a semi-circular sleeve within the passage with a middle portion of the sleeve adjacent a valve body, passing a process fluid through the passage when the sleeve is in a fully open state, and introducing a closing fluid into a space between the middle portion of the sleeve and the valve body, thereby displacing the middle portion of the sleeve into the passage and restricting the flow of the process fluid through the passage;

further comprising the step of increasing the amount of the closing fluid introduced into the space, thereby displacing the middle portion of the sleeve into a fully closed state, contacting the middle portion of the sleeve with a channel located within the passage, completely restricting the flow of the process fluid through the passage between the channel and the middle portion of the sleeve, but permitting the flow of the process fluid within the channel.

8. The method according to claim 7, further comprising the step of increasing an amount of the closing fluid introduced into the space, thereby displacing the middle portion of the sleeve into a fully closed state and completely restricting the flow of the process fluid through the passage.

9. A valve, comprising:

a valve body defining a passage;

a semi-circular sleeve including opposed edges sealingly mated with an interior of the valve body and a displaceable middle portion; and a port located in the valve body adjacent the sleeve and adapted for fluid communication with a pressurized fluid source, wherein when fluid is introduced through the port, the middle portion of the sleeve is displaced into the passage to at least partially close the passage;

the valve body includes a first body sleeve-receiving member and a second body member connected to define the passage, and the middle portion of the sleeve, when in a fully open state, is adjacent the first sleeve-receiving body member; and further including a channel connected to and extending along the second body member within the passage, wherein when the middle portion of the sleeve is fully displaced, the channel prevents the passage from being completely closed off by the sleeve, and further wherein:

the first sleeve-receiving body member includes opposed end flanges, the second body member includes opposed end flanges, the sleeve includes opposed end flanges, the sleeve end flanges are positioned adjacent the end flanges of the first sleeve-receiving body member, and a gasket is positioned on an opposite side of the passage from each sleeve end flange.

* * * * *

UNITED STATES PATENT AND TRADEMARK OFFICE
CERTIFICATE OF CORRECTION

PATENT NO. : 6,923,421 B2
DATED : August 2, 2005
INVENTOR(S) : Chris Raftis

It is certified that error appears in the above-identified patent and that said Letters Patent is hereby corrected as shown below:

Title page,
Item [56], References Cited, add the following:
-- FOREIGN DOCUMENTS
EP 0175028    3/1986 --.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO.   : 6,923,421 B2                                              Page 1 of 1
DATED        : August 2, 2005
INVENTOR(S)  : Chris Raftis It is certified that error appears in the above-identified patent and that said Letters Patent is hereby corrected as shown below:

Title page,
Item [56], References Cited, insert the following:
-- FOREIGN PATENT DOCUMENTS
EP      0175028         3/1986 --.

Signed and Sealed this

Twenty-first Day of February, 2006

JON W. DUDAS
*Director of the United States Patent and Trademark Office*